Sept. 20, 1971  J. A. WISE  3,606,000
THERMOFORMED PLASTIC COVERED CONNECTORS
Filed July 3, 1968  5 Sheets-Sheet 1
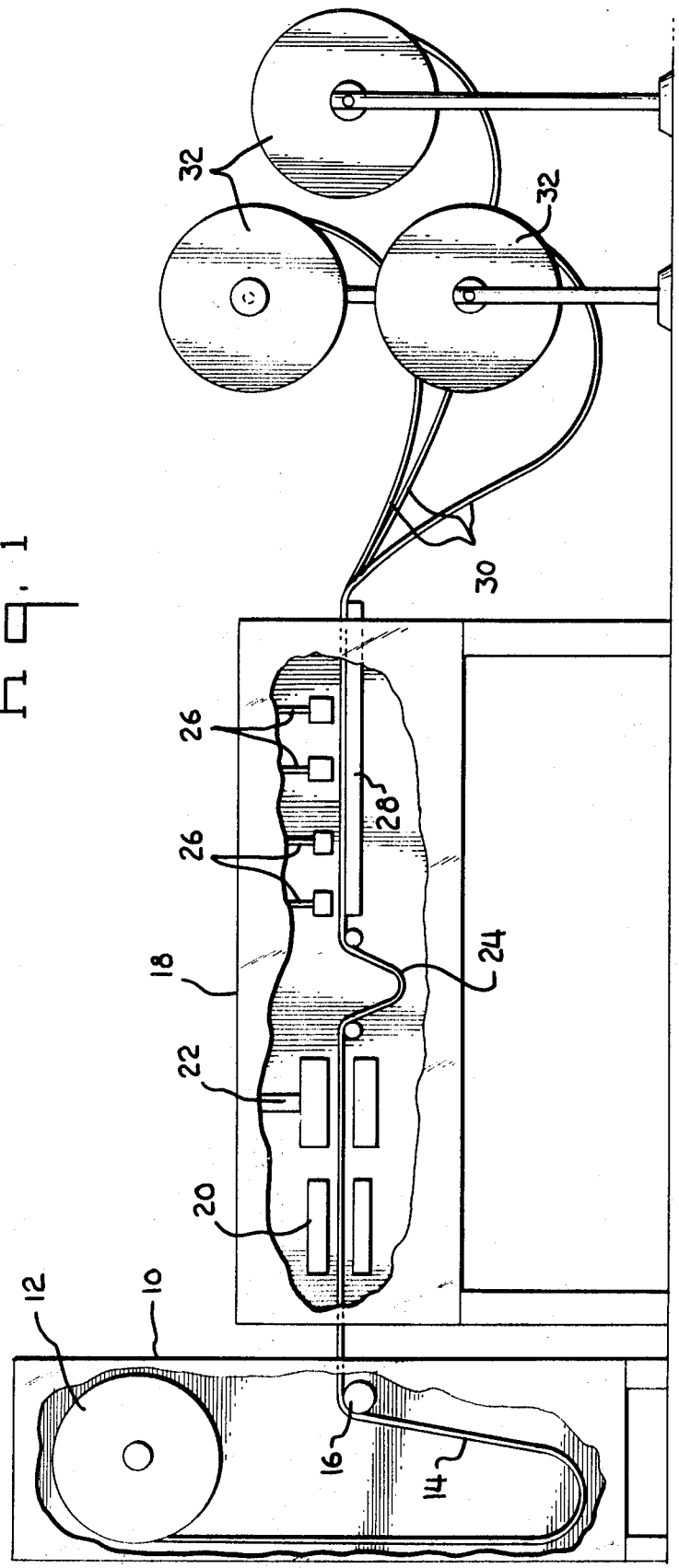

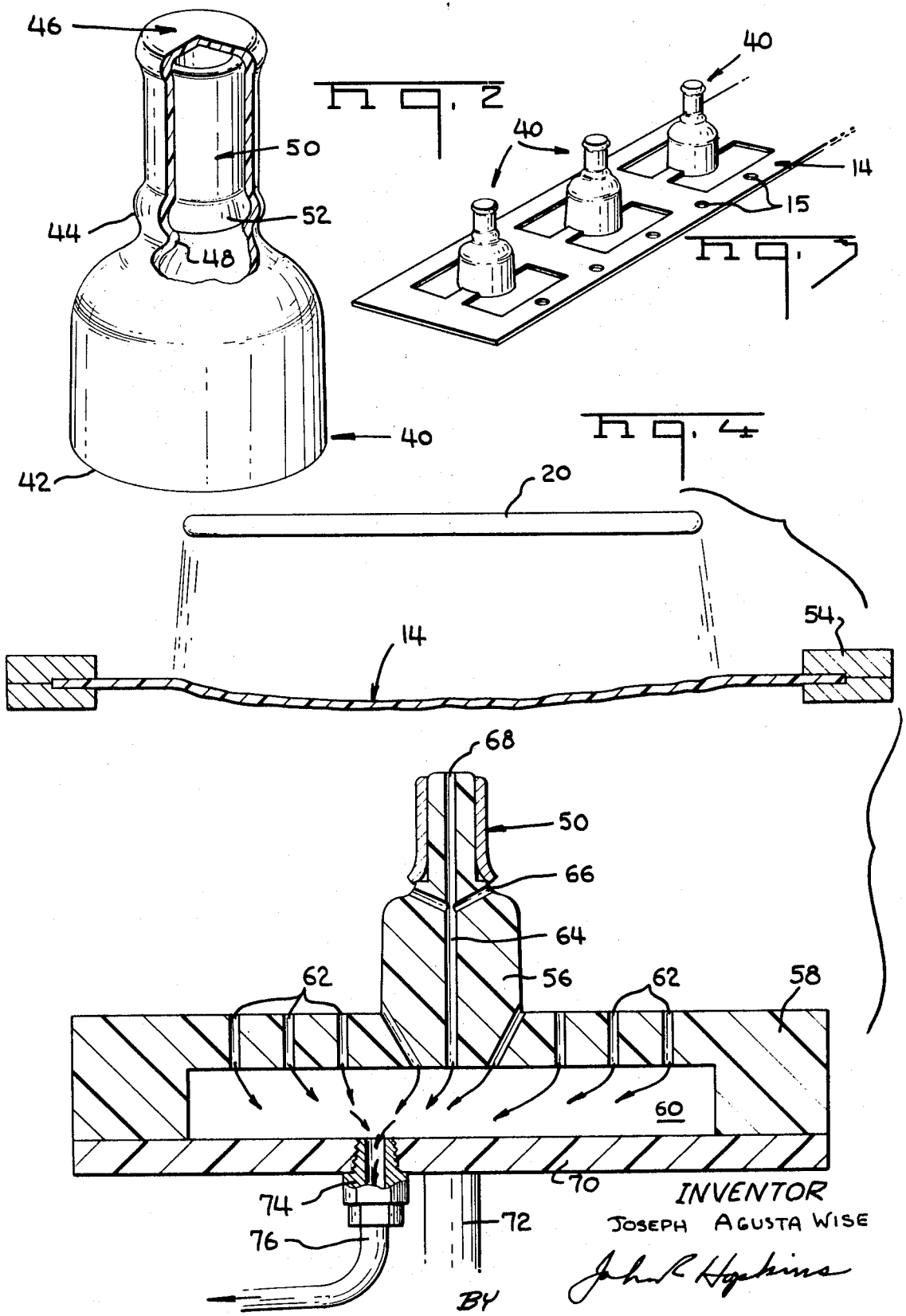

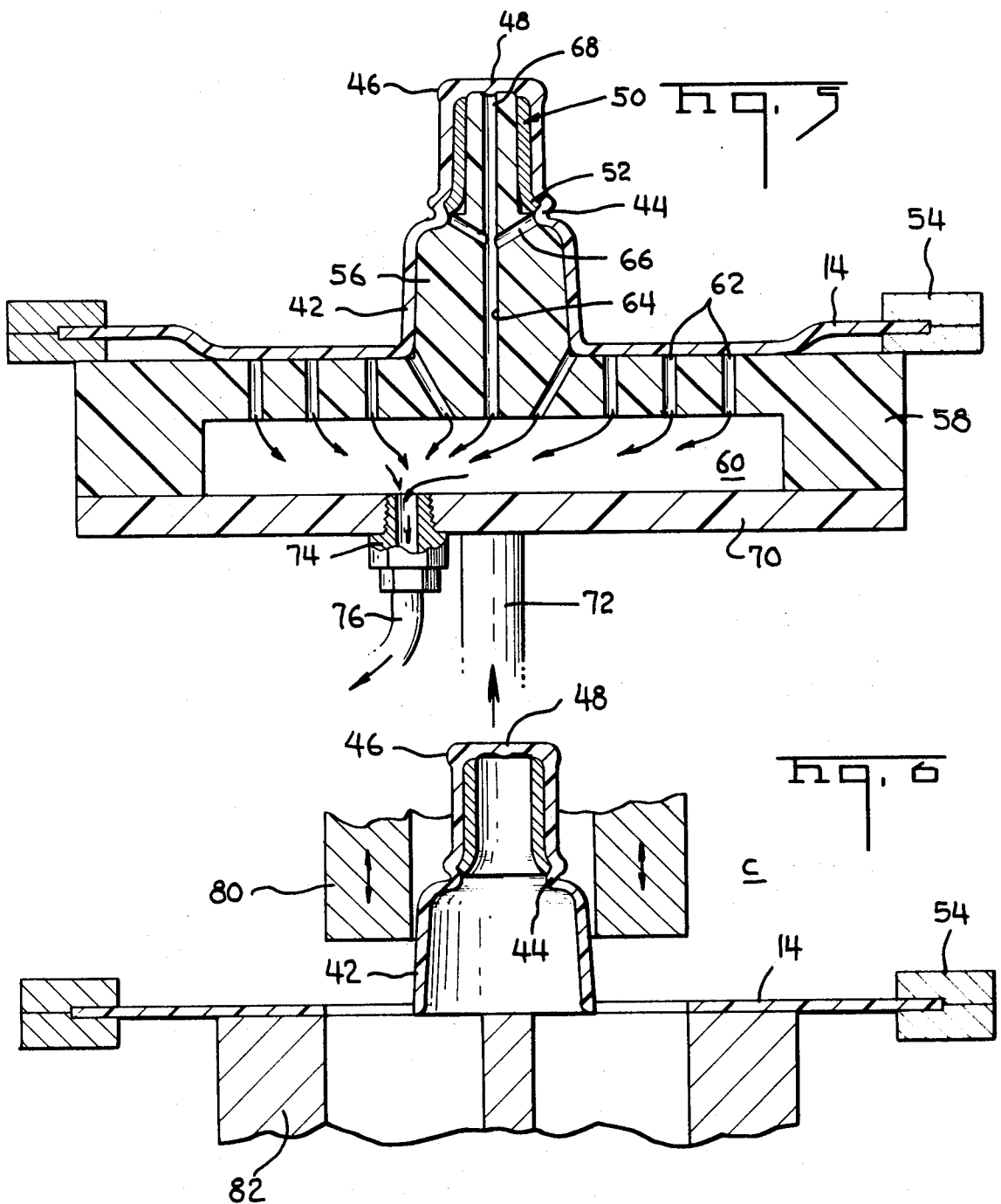

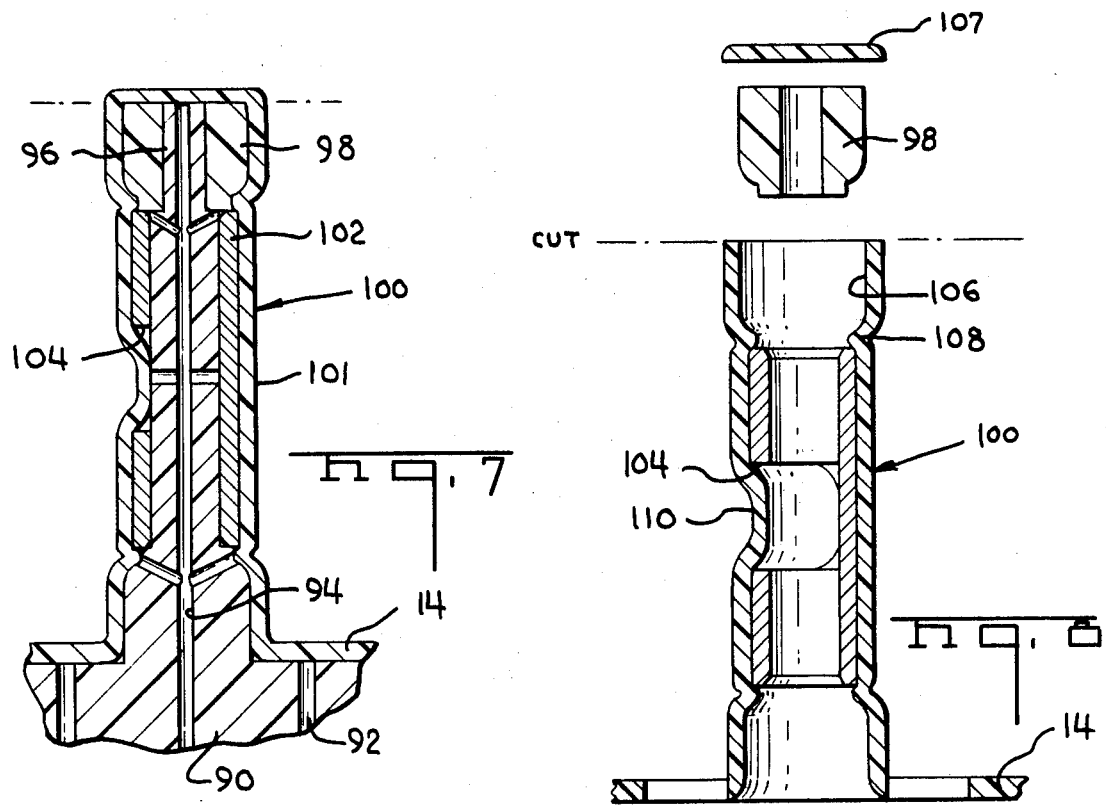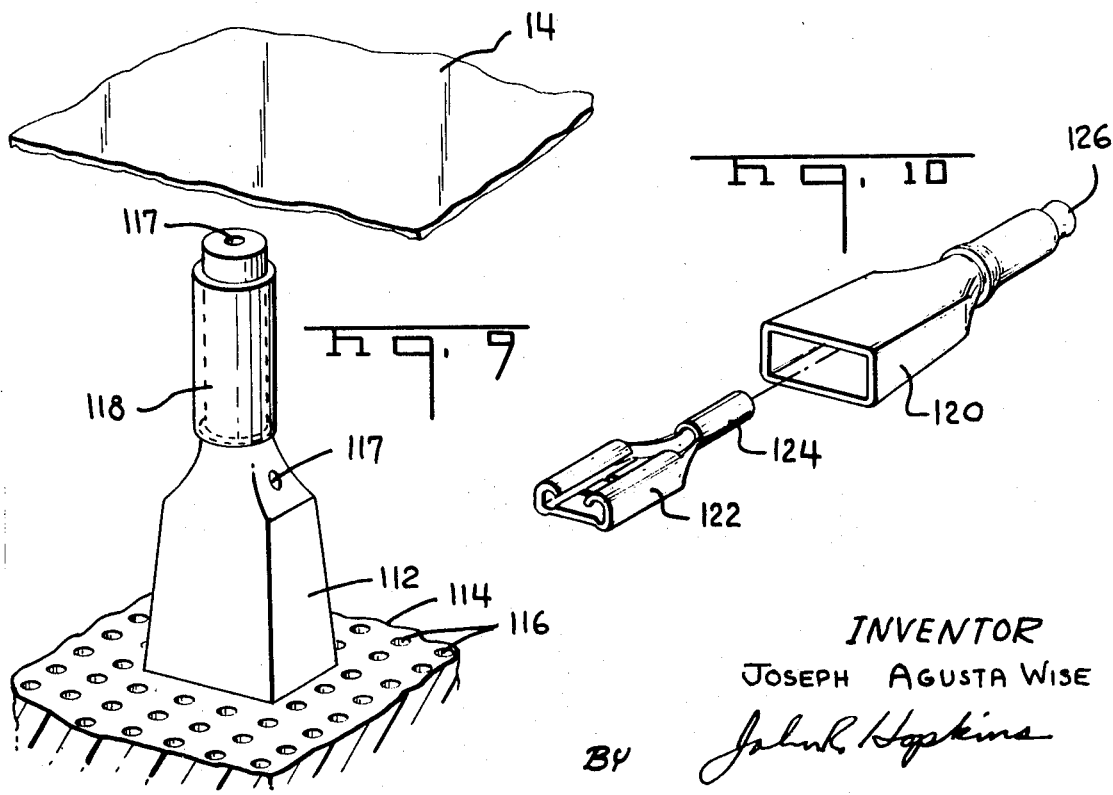

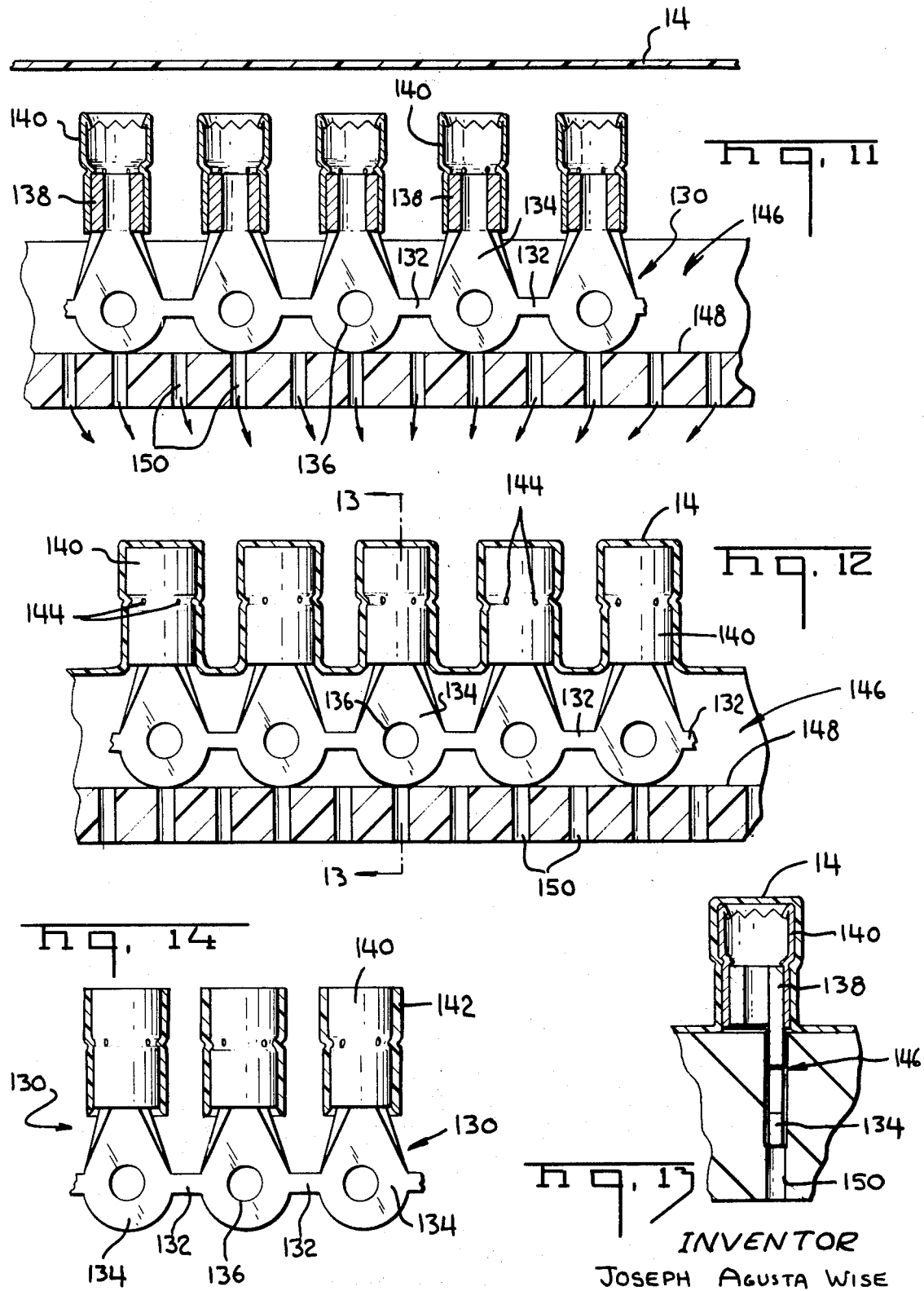

United States Patent Office 3,606,000
Patented Sept. 20, 1971

3,606,000
THERMOFORMED PLASTIC COVERED CONNECTORS
Joseph Agusta Wise, Mechanicsburg, Pa., assignor to AMP Incorporated, Harrisburg, Pa.
Filed July 3, 1968, Ser. No. 742,427
Int. Cl. B65d *69/00, 73/02*
U.S. Cl. 206—56
1 Claim

ABSTRACT OF THE DISCLOSURE

Connectors including a plastic covered metal element are manufactured by thermoforming flat stock plastic sheet material onto a mandrel of an appropriate configuration and then cutting away portions of the formed sheet to provide an article of a desired configuration. The mandrel is made to carry the metal element which is locked into the plastic covering by reason of a vacuum drawn through holes in the mandrel during forming. In one embodiment a preformed metal element is itself used as the mandrel with the plastic sheet material thermoformed around a portion thereof and then trimmed to provide a final article configuration. Assemblies of plastic covered elements are provided by leaving a portion of the thermoformed strip as a web between individual elements or alternatively, thermoforming insulating sheet material onto strips of metal elements joined by a web of sheet metal stock from which the elements were initially formed.

BACKGROUND OF THE INVENTION

Plastic covered electrical connectors and mechanical fasteners are presently manufactured in a number of ways usually involving separately forming metal and plastic elements and then assembling such elements together. The plastic elements which form gasket washers or mounting bodies for fasteners and mechanical connectors are usually secured to the metal elements by deforming a portion of the metal element therearound, or forming one of the elements within the other element into a frictional engagement. The plastic elements utilized for housing and/or insulating electrical connector terminals and the like are usually joined by staking of the plastic material to the metal element, or by bonding or molding of the plastic around the metal elements. Aside from the extra cost related to these assembly steps, an additional opportunity for production variation is present which has a direct bearing upon overall quality and reliability of the affected assembly of elements.

SUMMARY OF THE INVENTION

The present invention relates to a method of manufacturing plastic covered connector and fastener devices and to articles of manufacture having a thermoformed covering of plastic sheet material.

It is an object of the present invention to provide a method of manufacturing connectors and fasteners having a plastic element secured to a metallic element in a manner improved with regard to the surface engagement of the plastic material and the metallic element. It is another object to provide articles of manufacture in the form of electrical connectors and mechanical fasteners having a plastic covering of at least a portion of a metallic element which covering has characteristics of consistency of material and dimension not readily available with premolded and assembled structures of similar function. It is yet another object to provide an assembly of electrical and/or mechanical connectors or fasteners of a type having a plastic covering on at least a portion of a metallic structure with the individual devices precisely spaced and joined together by an integral web of the plastic forming the covering for such devices. It is yet another object to provide a method of fabricating electrical and/or mechanical connectors, fasteners and the like which permits a continuous and high speed production of reelable strips of such devices and thereby facilitates a better control of production tolerances to the end of providing a more consistent and reliable article of manufacture.

The foregoing objectives are attained by the invention by thermoforming plastic sheet material onto a mandrel made to contain a metallic insert having a connector or fastener function and then blanking the formed plastic shape to define essentially the end configuration of the connector or fastener article. In a preferred embodiment the plastic sheet stock has characteristics to provide the desired mechanical and/or electrical requirements of the article in use and yet permit the forming down of the material over the mandrel into engagement with the metallic insert and around portions of such insert to be secured thereto. In the preferred embodiment a vacuum is drawn around a given mandrel and through such mandrel to pull the plastic material into an even engagement with the mandrel surface and with the metallic insert or a portion thereof. The mandrel is then withdrawn from the formed structure leaving the insert within the formed plastic material. In accordance with the invention the plastic material is then moved to various cutting stations wherein dies are brought down to cut away portions of the material from the formed assembly to define essentially the final configuration of the given article. In accordance with a preferred embodiment, the entire process is continuous, beginning with a supply of plastic sheet material which is first heated, then thermoformed over fixed mandrels containing inserts with the mandrels then being withdrawn and the material moving onto cutting stations and with the individual articles left joined together in a strip of the plastic material to be then reeled for storage, handling and eventual use in automatic equipment.

In the drawings:

FIG. 1 is a schematic view showing the various steps in the manufacture of a strip-carried assembly of connectors and/or fasteners and the like;

FIG. 2 is a perspective, partially sectioned, of an illustrative embodiment of a connector in accordance with the present invention;

FIG. 3 is a perspective view showing strip carrying connectors like that shown in FIG. 2;

FIG. 4 is an elevational view in partial section showing a thermoforming station including a mandrel of a configuration to form the connector shown in FIGS. 2 and 3;

FIG. 5 is a view of the structure shown in FIG. 4 with plastic sheet material formed down over the mandrel;

FIG. 6 is a view of the connector formed in FIG. 5, at a cutting station;

FIG. 7 is a sectional view of a connector of a different illustrative embodiment in the process of being formed over a mandrel of a type having separable parts;

FIG. 8 is a view of the structure shown in FIG. 7 at a subsequent station depicting removal of a portion of the plastic sheet material and removal of a portion of the mandrel;

FIG. 9 is a perspective view of yet another illustrative connector embodiment, just prior to thermoforming;

FIG. 10 is a perspective view of an assembly of a part formed on the mandrel shown in FIG. 9 with a further part aligned for insertion therein;

FIG. 11 is an elevational view, in partial section, of a strip of electrical terminals positioned for thermoforming of a sheet of plastic thereon to provide pre-insulated terminals;

3

FIG. 12 is a view of the structure shown in FIG. 11 with the plastic sheet material formed on the terminals;

FIG. 13 is a sectional view taken through lines 13—13 of FIG. 12; and

FIG. 14 is a view of the structure as shown in FIGS. 11 and 12 following a cutting step to leave a finished product in the form of a strip of pre-insulated electrical terminals.

DESCRIPTION OF PREFERRED EMBODIMENT

FIG. 1 is a schematic view of a continuous manufacturing process intended to illustrate the various steps of manufacture contemplated by the present invention. To the left in FIG. 1 is a source of plastic sheet material denominated generally as 10, including a reel 12 from which is supply of plastic sheet material 14 is drawn. The sheet material is fed over a supply roller 16 into an assembly and working stage denominated generally as 18. Heating elements shown as 20 within 18 are utilized upstream of sheet flow in the apparatus to preheat the plastic material to a suitable temperature for thermoforming, such temperature being somewhat dependent upon the particular plastic material employed. Next, in order of flow of the material, is a mandrel and forming stage 22 which will be detailed hereinafter. Briefly, the stage 22 includes a plurality of mandrels and apparatus for loading such mandrels with metallic elements of connectors and an appropriate source of negative pressure piped through such mandrels to draw the plastic sheet material down around the mandrels and form the device being manufactured. In accordance with the invention, after the forming step in stage 22 the formed sheet material carrying metallic inserts is then supplied through a take-up loop 24 which may be utilized for cooling and for regulating the feed rate of the system to a cutting stage shown as 26. At 26 a series of cutters are arranged to be driven down against a backup and support plate 28 to trim off portions of the plastic sheet material to define essentially the finished configuration of the connector being manufactured. As can be visualized from FIG. 1, the system contemplates leaving at least a web of the plastic sheet material joining the individual connectors to form a carrier. The invention also contemplates leaving portions of the sheet to serve as a mounting flange or the like for a connector assembly.

The last or downstream cutting stage of 26 may be considered as slitting the width of the sheet material so that a plurality of individual strips of formed connectors may be separately reeled. These strips are shown as 30, being reeled upon a number of reels shown generally as 32. The reels 32 contain a relatively large number of individual connectors joined together by a web of the plastic material forming the covering of the individual connectors may be then utilized with automatic equipment capable of applying the individual connectors in an appropriate manner. For example, reels of electrical terminals may be utilized in conjunction with application tooling which will strip wires and insert them in individual connectors and then crimp the individual connectors to provide an insulated termination of the electrical conductors.

It is contemplated that the last stage of 26 might be caused to sever the formed connectors from the strip so as to provide a loose piece output from 18 for packaging in a number of standard ways, such as in bags or other containers which are more frequently used in low volume applications.

For certain applications plastic sheet material is not commercially available in a thickness amenable to reeling and a source of material such as 10 cannot be utilized. The invention contemplates as an alternative a supply of sheets of plastic material which are fed one at a time into an apparatus such as 18, from a stack supply. In the case of this latter embodiment the stage 26 would, as heretofore mentioned, produce a loose piece output of individual connectors rather than the reelable strip depicted in FIG. 1.

With the general organization and arrangement of the invention method now in mind, reference is made to FIGS. 2–6, which show in some detail the method of the invention as applied to an invention article in the form of a connector. The connector shown as 40 in FIGS. 2 and 3 is a form of a closed end electrical connector which is used to terminate the stripped ends of two or three electrical leads. The connector 40 is comprised of an outer plastic covering 42 which is open at the lower portion thereof shown in FIGS. 2 and 3. At the upper end of the connector 40 and within the plastic covering is a malleable ferrule 50 which includes a lower end flared outwardly as at 52. The covering 42 is secured to the ferrule 50 by being formed therearound with a portion shown as 44 drawn over the end 52 of the ferrule. The covering 42 is also made to include a wire guide portion 48 drawn inwardly of 52. The covering 42 is closed over the other end of 50 as at 46. In use the stripped ends of two or three electrical leads are poked in the connector with the enlarged and lower portion of the covering and the portion 48 serving to guide and center the leads being inserted within the ferrule 50. After insertion of the leads the device is crimped through dies applied to the covering surrounding 50 to an extent to deform the ferrule into an engagement with the conductive material of the leads working the surfaces of the leads and the inner surface of the ferrule together in a way to provide a stable interface which mechanically and electrically terminates the wire leads together. In the embodiment of FIGS. 2–6 the connector 40 is illustrated as an electrical connector or terminal and the plastic and metal elements are given characteristics appropriate to electrical terminations. Thus the plastic material would be expected to have insulating and dielectric properties and the ferrule would be of a metal compatible with the metal of the wire leads terminated by the device.

As can be discerned, the connector 40 is comprised of a plastic covering and a metal ferrule with such elements being secured together through the forming of the plastic material around a portion of the ferrule and with the covering providing a number of additional functions relative to the insertion of leads within the device and the insulation of such leads following crimping of the device. The device shown in FIG. 2 represents a single electrical connector or terminal. FIG. 3 depicts a section of a strip containing a series of connectors 40 joined together by a carrier comprised of the plastic sheet material 14 having portions cut out as shown in FIG. 3 to define essentially the final configuration of the connectors 40. Pilot holes 15 are provided in the carrier to facilitate handling of the strip of connectors in automatic application equipment. Each of the connectors 40 is joined to the carrier by a web of the material 14 left joined to the main body of the covering. In use a reel or roll of carrier-mounted connectors 40 would be supplied to a work station where wires would be disposed within a given connector with the connector then being crimped and either before or after crimping, severed from the carrier material by cutting blades driven through the web joining the connector to the carrier.

FIG. 4 shows schematically and in partial section, a view of the method of the invention taken through a forming mandrel looking upstream from the stage 22 toward the stage 20 depicted in FIG. 1. In accordance with the invention the heating stage 20 is controlled in terms of position relative to the supply of sheet material 14 and relative to temperature and rate of movement of 14 so as to cause 14 to soften prior to the thermoforming step within stage 22. The softening of 14 is evidenced in FIG. 4 by the characteristic bubble or sag toward the center of the sheet material. In accordance with the invention the sheet material is moved through guide members shown at 54, in FIG. 4, which engage the outside edges of the sheet which remain in an unsoftened condition. Beneath the bubbled portion of the sheet within stage 22 is a mandrel 56, having the general configuration of the connector device to be formed. The mandrel 56 includes a base portion 58 shaped to define an air space 60, extending beneath the mandrel proper. A series of air holes or apertures 62 are provided across the surface of the base 58 and as indicated by numerals 64, 66 and 68, are extended up within the mandrel 56. The air space 60 is effectively sealed by a plate or wall 70, as shown in FIG. 4, joined to a mandrel driving arm 72. The air space 60 is connected to a negative pressure source through a pneumatic fitting 74 and a flexible hose 76, permitting movement of the mandrel through actuation of arm 72.

As can be discerned from the showing in FIG. 4, the upper portion of the mandrel proper is made to carry a ferrule 50 fitted thereover and centered thereon. The invention method contemplates that the mandrel 56 be loaded with a ferrule 50 prior to the thermoforming step. In practice movable mandrel assemblies may be provided to be alternatively displaced relative to the thermoforming stage to permit one mandrel assembly to be loaded with ferrules while the other mandrel assembly is in position for thermoforming.

FIG. 5 shows the bubbled sheet 14 thermoformed onto the mandrel apparatus depicted in FIG. 4. As can be discerned from FIG. 5, the bubbled portion of sheet 14 and the mandrel assembly are brought to relative closure with negative pressure drawn through the mandrel surfaces to pull the softened sheet material down onto the mandrel and around the mandrel proper and the ferrule 50 mounted thereon to thermoform the plastic material into the desired configuration. The air holes of apertures 66 are of particular importance relative to the illustrative embodiment of the connector shown in that the covering is at this point on the mandrel drawn down to entrap the ferrule 50 within the covering of the connector and to provide the guide ends surface 48 heretofore mentioned.

In accordance with the invention concept, following the thermoforming step indicated in FIG. 5, the mandrel assembly is drawn downwardly away from sheet 14 leaving the ferrule 50 secured within the covering 42 of the connector 40. The sheet 14 is then moved to the cutting stage 26 depicted in FIG. 1 and as shown in FIG. 6 and cutting dies represented as 80 and 82 are brought together to blank out portions of 14 to finish defining the configuration of 40.

While the embodiment thus far described to illustrate the invention is an electrical connector in the form of a closed end terminal and the remaining embodiments of the application are also electrical connectors or terminals, it is fully contemplated as applicable to mechanical connectors wherein a metal or plastic element is covered at least in part by a plastic material.

The connector 40, for example, can be visualized as a mechanical connector capable of joining together a plurality of wires or straps used for binding purposes. A number of fastening devices exist which have a threaded nut or a sheet metal stamping equivalent to a threaded nut having at least a partial covering of plastic which is utilized to protect the nut and mating screw from adverse environment and to provide a resilient connection with other elements by serving the function of a resilient washer or for sealing purposes. Visualizing the structure 40 as a mechanical fastener, 50 would become a plastic or metal nut capable of receiving a threaded screw or bolt with the covering 42 being made to bear against one of the elements being fastened together. In such case the plastic covering would be given characteristics in terms of strength and/or resiliency to provide an appropriate locking or sealing action, as well as providing a protective covering for the nut and screw assembly.

FIGS. 7 and 8 illustrate an alternative embodiment of the invention in the form of an open-ended electrical splice 100. The splice 100 provides a preinsulated connector assembly capable of electrically and mechanically terminating lead wires inserted from each end of the splice. Splice 100 includes an inner metal ferrule 102 adapted to be crimped down through a crimping force applied through dies to an outer insulating sheath 101. The method of the invention is applied substantially as indicated in FIG. 1, with plastic sheet material 14 being first heated and then drawn down over a mandrel and thereafter cut and blanked to a final configuration. In accordance with the embodiment shown in FIGS. 7 and 8, the mandrel assembly is comprised of a mandrel 90 containing a series of apertures 92 and 94 extending through the mandrel body in a distribution designed to pull the plastic sheet material tightly in against the mandrel body and ferrule 102. The upper portion of the mandrel body includes a stem 96 of reduced diameter over which is fitted a separable mandrel piece 98 having an exterior configuration to define an enlarged wire guide entry portion at one end of the assembly. As can be discerned from FIG. 8, following forming of the sheet material about the compound mandrel the end cap piece of the sheet shown as 107 is removed with the separable mandrel piece then being removed and the mandrel body being withdrawn. Each end of the splice includes a wire guide and support portion shown by numeral 106 relative to the upper end of splice 100 and a locking and guiding inwardly directed portion shown as 108, drawn inwardly of the end of the ferrule 102. The center of the spice is drawn inwardly as at 110 to provide an inspection port so that the ends of wires poked into the splice may be observed prior to crimping to assure a proper termination of such wires. As in the previous example the characteristics of the plastic material would include appropriate insulating and dielectric properties and in the splice embodiment would preferably include a transparent property, at least in the region of 110.

FIGS. 9 and 10 represent yet another embodiment of an electrical connector and another embodiment of a method of forming connector devices. A mandrel 112 can be seen in FIG. 9 disposed beneath a bubbled portion of a sheet of plastic material 14 and extended upwardly from a mandrel block 114, apertured as at 116. The mandrel body includes a series of apertures 117 extending therethrough. The upper end of the mandrel body is relieved to receive an insert 118 in the form of a metal or plastic retaining sleeve. FIG. 10 shows the finished configuration of a connector covering 120 formed by the invention to receive an electrical terminal 122. The end of 120 would be removed to permit the insertion of a wire into 124 for termination to 122. In accordance with the invention the retaining sleeve 118 is dimensioned to receive the rear portion 124 of the terminal in a wedging fit to lock the terminal within covering 120. The connector formed by elements 122 and 120 is utilized by inserting a stripped wire inwardly of the reduced sleeve portion 126 of the covering into 124 and then crimping down through the covering to deform 124 into an intimate and permanent engagement with the conductive portions of the wire. The assembly formed thereby represents an insulated connector having spring characteristics and capable of terminating a wire to a spade or post inserted within the spring portion of 122.

FIGS. 11–14 depict yet a further embodiment of the invention and a further aspect of the method of the invention relative to a strip of ring-tongue terminals 130. The terminals 130 each include a contact portion 134 apertured as at 136 to be placed over a threaded post of a terminal block. The terminals further include a rear portion 138 forming a tubular crimping ferrule adapted to receive the stripped end of a wire inserted therein. A wire guide structure formed of a stamped metal part 140 is shown fitted over and locked to the rear portion of the terminal. The individual terminals of 130 are joined together by a web of material 132 left during stamping and forming of the terminal elements. The web 132 serves as a carrier so that the terminals may be reeled and handled by automatic and continuous assembly and plating equipment during production and processed automatically in termination machines. The terminals 130 are representative of standard preinsulated terminals with the exception that the wire guide sleeves 140 are provided with a series of small apertures 144 to aid in the forming of insulating sheet material therearound. FIG. 12 shows a plastic sheet material 14 pulled down over the strip of terminas. As can be discerned from FIGS. 12 and 13, the thermoforming station is comprised of a terminal strip guide 146 which is in the form of a slot having a floor 148 which receives and supports the ends of the terminals to position the wire crimping portion thereof upwardly of the slot. FIG. 13 shows the thermoforming station in section with the array of terminals fitted therein and with plastic sheet material formed thereabout. The floor 148 includes a series of apertures 150 through which a negative pressure is drawn to pull the plastic sheet material down and around the terminal barrel portions. The upper surface of 146 serves to prevent the plastic sheet material from being drawn around the forward portions of the terminals. FIG. 12 depicts the strip of terminals immediately following the forming step and FIG. 14 depicts the strip of terminals following the cutting step to provide an entry for the insertion of wires into the terminals. The embodiment represented in FIGS. 11–14 illustrates how a plurality of connector assemblies may be made simultaneously. The embodiment also represents how the invention can be employed utilizing the metal from which the connectors were formed as the carrier with the plastic covering serving only the function of preinsulation. The invention contemplates a use of the method shown in FIGS. 11–14 where the connector elements are not joined together but are individually supplied to the thermoforming stage with the plastic material being blanked to provide a plastic carrier as in the previous embodiments. The connector elements are in this embodiment individual "mandrels" which remain within the strip for eventual use as connectors. While a permanent engagement of connector elements and plastic is shown in FIGS. 11–14, the invention contemplates that separable connector assemblies may be made. For example, the connector element which serves as a mandrel might be a threaded screw with the plastic sheet formed down to define a threaded nut; the two parts being separated only when used. A number of plastic materials have been utilized in actual embodiments of the invention. One such material is a relatively rigid polyvinyl chloride marketed by the Goodrich Company under the trademark Geon. This material is available in roll form and samples of the material of 0.060 thousandths of an inch and 0.032 thousandths of an inch in thickness have been found to work quite well. The Geon material is a thickness of 0.093 thousandths of an inch is also available in roll form and can be utilized. Geon has a forming temperature of 375° F. and an operating temperature in use of 160° F. An acrylic alloy which is a type of polyvinyl chloride made be the Rohm and Haas Company and marketed under the trademark Kydex has been successfully employed in thicknesses of 0.060 and 0.040 thousandths of an inch. This latter material has a forming temperature of 390° F. and an operating temperature in use of at least 160° F. A General Mills 1200 Series transparent polyamide 0.030 and 0.060 thousandths of an inch has been successfully used to represent a forming of a high molecular weight plastic material. The forming temperature for such material is approximately 480° F. and the operating temperature for such material is approximately 222° F. Both straight polyethylene and a radiated polyethylene providing crosslinked structure of 0.060 thousandths of an inch has been employed.

In the foregoing examples negative pressures of 27 inches (Hg) were found to work quite well in terms of drawing the material into a tight and smooth surface engagement with the metal elements of the various assemblies.

The term thermoforming as used in the application is intended to mean forming by negative or positive pressure or combinations of such pressures. While the illustrative embodiments have been directed to vacuum forming onto a male mandrel by drawing a vacuum through and around the mandrel, the invention contemplates the use of a positive pressure to force the sheet material onto the mandrel and/or the use of a female mandrel either separately or in conjunction with a male mandrel.

Having now disclosed the invention in terms intended to enable a preferred practice thereof in various modes, claim is appended which is intended to define what is believed to be inventive.

What is claimed is:

1. As an article of manufacture a connected series of electrical connector devices each comprised of an electrically conducting connecting eement and an electrical insulating plastic covering, each said element comprising surfaces disposed within said covering and said covering comprising a continuous plastic sheet having portions surrounding one end of each element with a portion of the sheet being frictionally secured to each said element to secure the elements within the covering, the said electrically conducting electrical connecting elements of said series including integral portions joining each connector device to an adjacent connector device and integral portions of said sheet connecting each connector device to an adjacent connector device.

References Cited
UNITED STATES PATENTS

| 2,526,277 | 10/1950 | Rogoff | 174—87 |
| 2,715,764 | 8/1955 | Pierce. | |
| 2,964,171 | 12/1960 | Chadwick | 206—56A3 |
| 3,095,677 | 7/1963 | Dreyfus et al. | 206—56AX |
| 3,103,774 | 9/1963 | Wall. | |
| 3,184,059 | 5/1965 | Kaplan | 206—80A |

JOSEPH R. LECLAIR, Primary Examiner

L. SUMMER, Assistant Examiner